United States Patent [19]
Yoneno et al.

[11] 3,933,666
[45] Jan. 20, 1976

[54] INSULATION MATERIAL

[75] Inventors: Hiroshi Yoneno, Osaka; Akira Inami, Hirakata, both of Japan

[73] Assignee: Matsushita Electric Industrial Co., Ltd., Japan

[22] Filed: July 17, 1974

[21] Appl. No.: 489,835

[30] Foreign Application Priority Data
July 20, 1973  Japan................................ 48-81804
July 20, 1973  Japan................................ 48-81807

[52] U.S. Cl.......... 252/62; 106/15 FP; 174/110 SR; 174/110 SY; 260/42.37; 260/42.53; 260/879; 260/880 R; 428/921
[51] Int. Cl.²..... H01B 3/30; C09K 3/28; C08J 3/20
[58] Field of Search...................... 252/62; 161/403; 260/880 R, 879, 42.37, 42.53; 174/110 SR, 110 SY; 106/15 FP; 117/137; 428/920, 921

[56] References Cited
UNITED STATES PATENTS

| | | |
|---|---|---|
| 2,419,202 | 4/1947 | D'Alelio........................ 260/880 R |
| 2,843,561 | 7/1958 | Ingley et al. .................... 260/880 R |
| 2,972,593 | 2/1961 | Daly............................. 260/42.37 X |
| 3,073,795 | 1/1963 | Veverka........................ 260/42.53 X |
| 3,157,614 | 11/1964 | Fischer ......................... 260/42.37 X |
| 3,260,772 | 7/1966 | Cummings ..................... 260/880 R |
| 3,635,850 | 1/1972 | Birkner et al.................. 260/880 R |
| 3,652,728 | 3/1972 | Cornay et al. ................. 260/879 X |

*Primary Examiner*—Harold Ansher
*Attorney, Agent, or Firm*—Wenderoth, Lind & Ponack

[57] ABSTRACT

An insulation material which comprises:
a. a major amount of 1,2-polybutadiene;
b. from 10 to 150 parts by weight of a styrene or styrene derivative per 100 parts by weight of 1,2-polybutadiene;
c. from 15 to 150 parts by weight of 2,4,6-tribromophenylacrylate per 100 parts by weight of the mixture of 1,2-polybutadiene and styrene or styrene derivative; and
d. from 100 to 300 parts by weight of talc powder per 100 parts by weight of 2,4,6-tribromophenyl acrylate.

3 Claims, 3 Drawing Figures

INSULATION MATERIAL

FIELD OF INVENTION

The present invention relates to an insulation material and especially relates to an insulation resin useful for electrical insulation.

DESCRIPTION OF THE PRIOR ART

As insulation materials for electrical application, various organic polymer compounds such as thermoplastic and thermosetting resins are known. Especially, as insulation materials for casting, potting, encapsulation and dipping of electric components, various thermosetting resins such as fireproof epoxy resin and unsaturated polyester resin are known. However, these resins usually have dielectric properties which change very much with the changes of temperature, high dielectric loss factor at a high temperature, low arc resistance and low tracking resistance. For these reasons, a fireproof epoxy resin and an unsaturated polyester resin are not suitable for insulation materials of electric components for high frequency and voltage.

BRIEF SUMMARY OF THE INVENTION

An object of the present invention is to provide an insulation material for casting, potting, encapsulation or dipping of electric components for high frequency and voltage.

Another object of the present invention is to provide an insulation material having low dielectric constant and low dielectric loss tangent.

Another object of the present invention is to provide an insulation material whose dielectric characteristics scarcely change over a wide range of temperature.

Another object of the present invention is to provide an insulation material having high arc resistance and high tracking resistance.

Another object of the present invention is to provide an insulation material having high firing resistance.

Another object of the present invention is to provide an insulation material having good mechanical characteristics such as high crack resistance and fast curing rate.

These and other objects of the present invention will be apparent upon consideration of the following detailed description taken together with the accompanying drawings.

DETAILED DESCRIPTION

Figure 1:
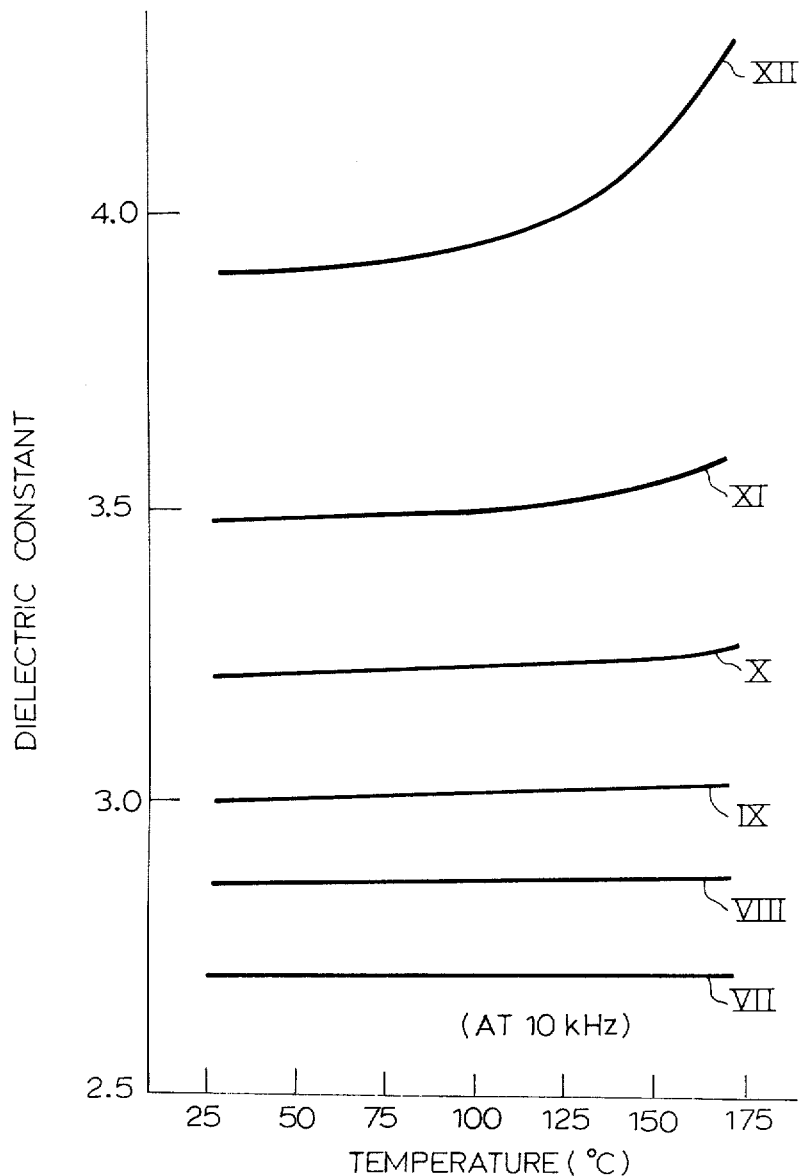
FIGS. 1, 2 and 3 are the graphs showing dielectric constant versus temperature of cured resins according to the present invention.

An insulation material according to the present invention consists essentially of a major amount of 1,2-polybutadiene, from 10 to 150 parts by weight of styrene or styrene derivative per 100 parts by weight of 1,2-polybutadiene, from 15 to 150 parts by weight of 2,4,6-tribromophenylacrylate per 100 parts by weight of the mixture of 1,2-polybutadiene and styrene or styrene derivative and from 100 to 300 parts by weight of talc powder per 100 parts by weight of 2,4,6-tribromophenylacrylate.

The novel insulation material according to the present invention has superior characteristics in electric properties such as low dielectric constant, low dielectric loss tangent, high arc resistance and high tracking resistance, and at the same time high firing resistance and good mechanical properties such as high crack resistance. Accordingly, electrical components having superior characteristics especially both in electrical properties and inflammability can be made using the novel insulation material according to the present invention.

Furthermore, by using the novel insulation material according to the present invention, electrical components can be made without injuring the property of embedded materials such as coils, semiconductors and so on, because the resin becomes hardened at relatively low temperature.

The 1,2-polybutadiene used in the present invention is a liquid pre-polymer having a number mean molecular weight (MW) preferably of 2,000 to 5,000, viscosity preferably of 5,000 to 20,000 centipoise (cp) at 25°C, and undergoes cross-linking reaction in the presence preferably of 0.5–5% dicumylperoxide as a catalyst by heating 130° to 150°C preferably for more than 60 minutes.

The cured 1,2-polybutadiene resin has properties as shown below:

| | | |
|---|---|---|
| Hardness (Rockwell) | M80 | (ASTM D785) |
| Crack resistance | Crack | (ASTM D1674) |
| Inflammability | Burning | (ASTM D635) |
| Dielectric constant | 2.4 | (ASTM D150) |
| Dielectric loss tangent | 0.001 | (ASTM D150) |
| Arc resistance | 80 second | (ASTM D495) |
| Volume resistance | $10^{16} \Omega$-cm | (ASTM D257) |

The above data show that cured 1,2-polybutadiene homopolymer has low dielectric loss factor. However, as mentioned above, the time required for curing is too long, and the temperature required for curing is too high for commercial application. In addition, 1,2-polybutadiene homopolymer mentioned above has another defect such as poor crack resistance, when the electric component is embedded. Another defect of 1,2-polybutadiene homopolymer is its tendency to flame. Therefore, it is not suitable to apply 1,2-polybutadiene alone as an insulation material for electric components.

The present invention relates to a composition comprising a resin compound which composition is useful for electrical insulation having fast curing rate, low dielectric loss factor, high arc resistance, high tracking resistance, high firing resistance and high crack resistance. The resin compound according to the present invention comprises 1,2-polybutadiene having a number mean molecular weight preferably of 2,000 to 5,000, styrene or styrene derivative, 2,4,6-tribromophenylacrylate, talc powder and organic peroxide as a catalyst. This compound is cured by heating at a temperature preferably higher than 100°C in the presence preferably of 0.5–3% by weight of a catalyst such as dicumylperoxide, tertiarybutylperbenzoate and benzoylperoxide. Curing can hardly be accomplished at a temperature less than 100°C.

It is one of the features of the present invention that the use of styrene or styrene derivaive as crosslinking agent for 1,2-polybutadiene can decrease the viscosity of the resin mixture. Preferable sytrene derivatives include chlorostyrene, divinylbenzene, vinyltoluene and ethylvinylbenzene as shown below.

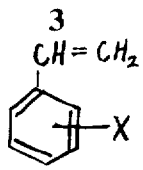

X: H, Cl, CH=CH$_2$ CH$_3$, C$_2$H$_5$

A preferable amount of styrene or styrene derivative is from 10 to 150 parts by weight per 100 parts by weight of 1,2-polybutadiene. In an amount less than 10 parts by weight of styrene or styrene derivative, the viscosity will not be sufficiently improved. With an increase of the relative amount of styrene or styrene derivative, the viscosity of the resin mixture decreases. In an amount more than 150 parts by weight of styrene or styrene derivative, the corresponding cured resin does not have sufficiently high crack resistance.

It is another feature of the present invention that 2,4,6-tribromophenylacrylate is added to the blend of 1,2-polybutadiene and styrene or styrene derivative as mentioned above. 2,4,6-tribromophenylacrylate is copolymerized with 1,2-polybutadiene and styrene or styrene derivative. The use of 2,4,6-tribromophenylacrylate is effective to reduce the temperature and the time for setting the blended mixture, and moreover to increase the resistance to flaming. With an increase of the relative amount of 2,4,6-tribromophenylacrylate, the inflammability of cured resin increases, and moreover, the crack resistance of cured resin increases, but at the same time, both the dielectric loss factor and the degree of variation of dielectric loss factor with the variation of temperatures increase. A preferable amount of 2,4,6-tribromophenylacrylate is from 15 to 150 parts by weight per 100 parts by weight of the blend of 1,2-polybutadiene and styrene or styrene derivative. In an amount less than 15 parts by weight of 2,4,6-tribromophenylacrylate, the effect thereof for firing resistance is insufficient, and the crack resistance is not improved sufficiently. When that amount is more than 150 parts, the dielectric loss factor of the cured resin becomes higher. However, cured resin including 2,4,6-tribromophenylacrylate has the disadvantage of insufficient arc resistance and tracking resistance.

It is another feature of the present invention that a talc powder is added to the blended resin of 1,2-polybutadiene, styrene or styrene derivative and 2,4,6-tribromophenylacrylate. The use of a talc powder avoids the disadvantage described above. The general chemical formula of talc is $Mg_3Si_4O_{10}(HO)_2$ and is variously named as talc, talk, talcum powder, steatite, soapstone, potstone, French chalk or Spanish chalk. With an increase of the relative amount of talc powder, the arc resistance and tracking resistance of the cured resin increase. A preferable amount of the talc powder is from 100 to 300 parts by weight per 100 parts by weight of 2,4,6-tribromophenylacrylate. When talc powder is present in an amount less than 100 parts by weight for 100 parts by weight of 2,4,6-tribromophenylacrylate, the corresponding cured resin is relatively easy to break down by arcing and tracking. When that amount is more than 300 parts, the blended mixture has too high a viscosity to be applied to the dipping, potting, casting and encapsulation of electric components.

The present invention is applicable to insulation materials including a mineral powder such as fused quartz glass, silica, mica and alumina.

The following examples illustrate the benefits to be obtained by the process of this invention and should not be construed as limitative.

EXAMPLE 1

Blended mixtures of 1,2-polybutadiene, styrene, 2,4,6-tribromophenylacrylate, talc powder, dicumylperoxide and benzoylperoxide as shown in Table 1 were prepared.

Table 1

| component | Parts by weight compound number | | | | | |
|---|---|---|---|---|---|---|
| | I | II | III | IV | V | VI |
| 1,2-polybutadiene (MW:5000) | 100 | 100 | 100 | 100 | 100 | 100 |
| styrene | 0 | 5 | 10 | 80 | 150 | 200 |
| 2,4,6-tribromophenylacrylate | 50 | 55 | 60 | 90 | 125 | 150 |
| talc powder | 75 | 78 | 80 | 135 | 188 | 225 |
| benzoylperoxide | 1.5 | 1.6 | 1.8 | 3 | 3.7 | 4.5 |
| dicumylperoxide | 3 | 3.2 | 3.6 | 6 | 7.4 | 9 |

In Table 1, the amount of styrene varies from 0 to 200 parts by weight per 100 parts by weight of 1,2-polybutadiene, and the amount of 2,4,6-tribromophenylacrylate is 50 parts by weight per 100 parts by weight of the blend of 1,2-polybutadiene and styrene, and the amount of talc powder is 150 parts by weight per 100 parts by weight of 2,4,6-tribromophenylacrylate. To 100 parts by weight of the mixtures of 1,2-polybutadiene, styrene and 2,4,6-tribromophenylacrylate are added 2 parts by weight of dicumylperoxide and 1 part by weight of benzoylperoxide as catalyst.

Each of the mixtures shown in Table 1 was poured into a mold in which a steel hexagonal bar was set as in ASTM (American Society for Testing Materials) D 1674-59T. They were heated for 1 hour at 120°C in an air oven, and were converted to a cured hard resin in which the steel hexagonal bar was embedded. Crack resistance was examined by using these samples. The dielectric properties of each cured hard resin was examined by the method of ASTM D-150. Arc resistance of each cured hard resin was examined by the method of ASTM D 495-58. Tracking resistance of each cured hard resin was examined by the method of DIN (Deutsche Industrie Normen, German Industry Standard) 53480. Flammability of each cured hard resin was examined by the method of ASTM D 635-56T. The viscosity of blended mixture was measured by the rotational viscometer at 30°C. Each of the mixtures in Table 1 was heated at 120°C for 1 hour in an air oven, and was converted to a cured hard resin. The tests mentioned above were carried out by using these samples. Thus, results shown in Table 2 were obtained.

Table 2

| property | results and measured values compound number | | | | | |
|---|---|---|---|---|---|---|
| | I | II | III | IV | V | VI |
| viscosity(poise) | more than 1000 | more than 1000 | 50 | 31 | 15 | 6 |
| crack resistance | no crack | no crack | no crack | no crack | no crack | crack |
| inflammability | nonburning | nonburning | nonburning | nonburning | nonburning | nonburning |
| arc resistance (seconds) | 183 | 183 | 183 | 183 | 182 | 181 |
| tracking resistance | KA3C | KA3C | KA3C | KA3C | KA3C | KA3C |
| dielectric constant (10kHz) | 2.95 | 3.01 | 3.12 | 3.28 | 3.31 | 3.42 |
| dielectric loss tangent | 0.005 | 0.005 | 0.006 | 0.007 | 0.007 | 0.009 |

The data in Table 2 clearly show that the resins having styrene in an amount from 10 to 150 parts by weight for 100 parts by weight of 1,2-polybutadiene, as shown in compound numbers III to V, have excellent properties in viscosity of the blend mixture and crack resistance, inflammability, arc resistance, tracking resistance, dielectric constant and dielectric loss tangent of cured resin. The resin having none or a small amount of styrene, as shown in compound number I or II, has too high viscosity to be applied industrially. The resin having large amount of styrene, as shown in compound number VI, showed poor crack resistance.

EXAMPLE 2

Blended mixtures of 1,2-polybutadiene, styrene, 2,4,6-tribromophenylacrylate, talc powder, dicumylperoxide and benzoylperoxide as shown in Table 3 were prepared.

Each of the mixtures was heated for 1 hour in a test tube immersed in an oil bath at 100°, 120° and 140°C. The external appearances of the resins were observed. The results are shown in Table 4.

Table 4

| heating temperature | Properties of the resin compound number | | | | | |
|---|---|---|---|---|---|---|
| | VII | VIII | IX | X | XI | XII |
| 100°C | liquid | semi-solid | hard | hard | hard | hard |
| 120°C | soft | soft | hard | hard | hard | hard |
| 140°C | hard | hard | hard | hard | hard | hard |

Each of the mixtures in Table 3 was heated for 1 hour at 120° or 140°C in an air oven. Crack resistance, inflammability, arc resistance, tracking resistance, dielectric constant and dielectric loss tangent of the cured hard resins were examined by the same method Table 3

| component | parts by weight compound number | | | | | |
|---|---|---|---|---|---|---|
| | VII | VIII | IX | X | XI | XII |
| 1,2-polybutadiene(MW4000) | 100 | 100 | 100 | 100 | 100 | 100 |
| styrene | 50 | 50 | 50 | 50 | 50 | 50 |
| 2,4,6-tribromophenylacrylate | 0 | 15 | 22.5 | 100 | 225 | 300 |
| talc powder | 0 | 23 | 33 | 150 | 340 | 450 |
| benzoylperoxide | 1.5 | 1.9 | 2.5 | 4 | 6 | 8.5 |
| dicumylperoxide | 3 | 3.8 | 5 | 8 | 12 | 17 |

In Table 3, the amount of 2,4,6-tribromophenylacrylate varies from 0 to 200 parts by weight per 100 parts by weight of the blend of 1,2-polybutadiene and styrene, the amount of talc powder is 150 parts by weight per 100 parts by weight of 2,4,6-tribromophenylacrylate, and the amount of talc powder is 50 parts by weight per 100 parts by weight of 1,2-polybutadiene. 2 parts by weight of dicumylperoxide and 1 part by weight of benzoylperoxide per 100 parts by weight of the blend of 1,2-polybutadiene, styrene and 2,4,6-tribromophenylacrylate is added as a catalyst.

as indicated in Example 1. The results shown in Table 5 were obtained.

Table 5

| property | results and measured values compound number | | | | | |
|---|---|---|---|---|---|---|
| | VII | VIII | IX | X | XI | XII |
| heating temperature (°C) | 140 | 140 | 120 | 120 | 120 | 120 |
| crack resistance | no crack | no crack | no crack | no crack | no crack | no crack |
| inflammability | burning | self-extinguishing | nonburning | nonburning | nonburning | nonburning |
| arc resistance (seconds) | 120 | 181 | 181 | 182 | 182 | 184 |
| tracking resistance | KA3b | KA3C | KA3C | KA3C | KA3C | KA3C |
| dielectric constant (10 kHz) | 2.70 | 2.86 | 3.00 | 3.21 | 3.48 | 3.90 |
| dielectric loss tangent | 0.002 | 0.004 | 0.005 | 0.007 | 0.010 | 0.015 |

From Table 5, it can be seen that the compound numbers IX to XI show considerably good properties in crack resistance, inflammability, arc resistance, tracking resistance, dielectric constant and dielectric loss tangent. In other words, the resins having 2,4,6-tribromophenylacrylate in the range from 15 to 150 parts by weight for 100 parts by weight of the blend of 1,2-polybutadiene and styrene show superior qualities. The mixture having none or a small amount of 2,4,6-tribromophenylacrylate, as shown in compound number VII and VIII, need comparatively high temperature to be cured to a hard resin, and in addition, the cured hard resins show poor results in the flammability test.

The plot of dielectric constant vs. temperature in the range of 25°C to 175°C for the cured hard resins of Table 5 are shown in FIG. 1. The resin having a large amount of 2,4,6-tribromophenylacrylate, as shown in compound number XII, shows higher dielectric constant than others and large variation of dielectric constant against the change of temperature.

EXAMPLE 3

Blended mixture of 1,2-polybutadiene, styrene, 2,4,6-tribromophenylacrylate, talc powder, dicumylperoxide and benzoylperoxide as shown in Table 6 were prepared.

examined by the same method as indicated in Example 1. The results as shown in Table 7 were obtained.

Table 7

| property | results and measured values compound number | | | | | |
|---|---|---|---|---|---|---|
| | XIII | XIV | XV | XVI | XVII | XVIII |
| viscosity (poise) | 2 | 6 | 10 | 48 | 100 | more than 1000 |
| crack resistance | no crack | no crack | no crack | no crack | no crack | no crack |
| inflammability | nonburning | nonburning | nonburning | nonburning | nonburning | nonburning |
| arc resistance (seconds) | 3 | 100 | 180 | 182 | 193 | 198 |
| tracking resistance | KA1 | KA2 | KA3C | KA3C | KA3C | KA3C |
| dielectric constant (10 kHz) | 2.68 | 2.81 | 2.92 | 3.08 | 3.30 | 3.64 |
| dielectric loss tangent | 0.002 | 0.003 | 0.004 | 0.006 | 0.007 | 0.009 |

From Table 7, it can be seen that the compound numbers XV to XVII show considerably good properties in viscosity, crack resistance, inflammability, arc resistance, tracking resistance, dielectric constant and dielectric loss tangent. In other words, the resins having talc powder in the range from 100 to 300 parts by weight per 100 parts by weight of 2,4,6-tribromophenylacrylate show superior qualities.

The cured resin having none or small amount of talc powder, as shown in compound number XIII and XIV, give poor results in arc resistance and tracking resistance. The resin having large amount of talc powder, as shown in compound number XVIII, shows too high a viscosity to be applied industrially.

Table 6

| component | parts by weight compound number | | | | | |
|---|---|---|---|---|---|---|
| | XIII | XIV | XV | XVI | XVII | XVIII |
| 1,2-polybutadiene (MW 3000) | 100 | 100 | 100 | 100 | 100 | 100 |
| styrene | 50 | 50 | 50 | 50 | 50 | 50 |
| 2,4,6-tribromophenylacrylate | 75 | 75 | 75 | 75 | 75 | 75 |
| talc powder | 0 | 38 | 75 | 150 | 225 | 300 |
| benzoylperoxide | 2.2 | 2.2 | 2.2 | 2.2 | 2.2 | 2.2 |
| dicumylperoxide | 4.4 | 4.4 | 4.4 | 4.4 | 4.4 | 4.4 |

In Table 6, the amount of styrene is 50 parts by weight per 100 parts by weight of 1,2-polybutadiene, and the amount of 2,4,6-tribromophenylacrylate is 50 parts by weight per 100 parts by weight of the blend of 1,2-polybutadiene and styrene, and the amount of talc powder varies from 0 to 400 parts by weight per 100 parts by weight of 2,4,6-tribromophenylacrylate. Benzoylperoxide and dicumylperoxide are added as catalysts.

Each of the mixtures was heated for 1 hour at 120°C in an air oven. Crack resistance, inflammability, arc resistance, tracking resistance, dielectric constant and dielectric loss tangent of each cured hard resins were

EXAMPLE 4

Blended mixture of 1,2-polybutadiene, a styrene derivative, 2,4,6-tribromophenylacrylate, talc powder, dicumylperoxide, benzoylperoxide and tertiarybutylperbenzoate as shown in Table 8 were prepared.

Table 8

| component | parts by weight compound number | | | | | |
|---|---|---|---|---|---|---|
| | XIX | XX | XXI | XXII | XXIII | XXIV |
| 1,2-polybutadiene (MW 4000) | 100 | 100 | 100 | 100 | 100 | 100 |
| styrene | 50 | — | — | — | — | — |
| chlorostyrene | — | 80 | 50 | 30 | — | — |
| vinyltoluene | — | — | — | — | 50 | — |
| divinylbenzene | — | — | — | — | — | 30 |
| ethylvinylbenzene | — | — | — | — | — | 20 |
| 2,4,6-tribromophenylacrylate | 75 | 80 | 75 | 60 | 75 | 75 |
| talc powder | 100 | 120 | 100 | 90 | 100 | 100 |
| dicumylperoxide | 4 | 5.2 | 4 | 3.8 | 4 | 4 |
| tertiarybutylperbenzoate | 2 | — | — | 1.9 | 2 | 2 |
| benzoylperoxide | — | 2.6 | 2 | — | — | — |

Each of the mixtures in Table 8 was heated for 1 hour at 120°C in an air oven. Crack resistance, inflammability, arc resistance, tracking resistance, dielectric constant and dielectric loss tangent of the cured resins were examined by the same method as indicated in Example 1. The results shown in Table 9 were obtained.

Table 9

| property | results and measured values compound number | | | | | |
|---|---|---|---|---|---|---|
| | XIX | XX | XXI | XXII | XXIII | XXIV |
| viscosity | 20 | 32 | 40 | 45 | 30 | 44 |
| crack resistance | no crack | no crack | no crack | no crack | no crack | no crack |
| inflammability | nonburning | nonburning | nonburning | nonburning | nonburning | nonburning |
| arc resistance (seconds) | 181 | 182 | 181 | 181 | 181 | 182 |
| tracking resistance | KA3C | KA3C | KA3C | KA3C | KA3C | KA3C |
| dielectric constant (10 kHz) | 3.02 | 3.15 | 3.05 | 2.91 | 3.04 | 3.00 |
| dielectric loss tangent | 0.005 | 0.007 | 0.006 | 0.005 | 0.005 | 0.005 |

Figure 2:
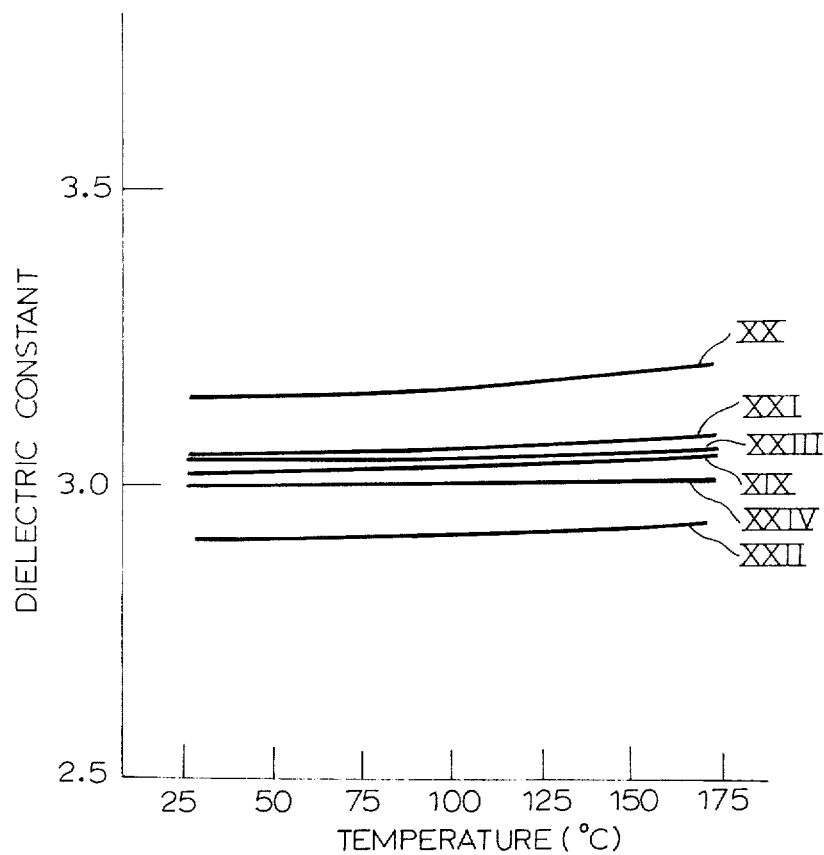

From Table 9, it can be seen that all compounds show considerably good properties in viscosity, crack resistance inflammability, arc resistance, tracking resistance, dielectric constant and dielectric loss tangent. The plot of dielectric constant vs. temperature in the range from 25°C to 175°C for the cured hard resins of Table 9 are shown in FIG. 2. From FIG. 2, it can be seen that dielectric constant of each compound scarcely changes over a wide range of temperature.

EXAMPLE 5

Blended mixtures of 1,2-polybutadiene, a styrene derivative, 2,4,6-tribromophenylacrylate, talc powder, dicumylperoxide, benzoylperoxide and mineral powder as shown in Table 10 were prepared.

Table 10

| component | parts by weight compound number | | | | | |
|---|---|---|---|---|---|---|
| | XXV | XXVI | XXVII | XXVIII | XXIX | XXX |
| 1,2-polybutadiene (MW 3000) | 100 | 100 | 100 | 100 | 100 | 100 |
| styrene | 40 | 40 | — | — | 20 | 20 |
| chlorostyrene | — | — | 60 | 60 | 20 | 20 |
| 2,4,6-tribromophenylacrylate | 60 | 60 | 40 | 40 | 70 | 70 |
| talc powder | 80 | — | 70 | — | 100 | — |
| fuse quartz glass powder | 80 | 160 | — | — | — | — |
| alumina hydrate powder | — | — | 70 | 140 | — | — |
| silica powder | — | — | — | — | 80 | 180 |
| antimony trioxide | 30 | 30 | 20 | 20 | 40 | 40 |
| benzoylperoxide | 2 | 2 | 2 | 2 | 2.1 | 2.1 |
| dicumylperoxide | 4 | 4 | 4 | 4 | 4.2 | 4.2 |

Each of the mixtues in Table 10 was heated for 1 hour at 120°C in an air oven. Crack resistance, inflammability, arc resistance, tracking resistance, dielectric constant and dielectric loss tangent of cured resins were examined by the same method as indicated in Example 1. The results as shown in Table 11 and FIG. 3 were obtained.

Figure 3:
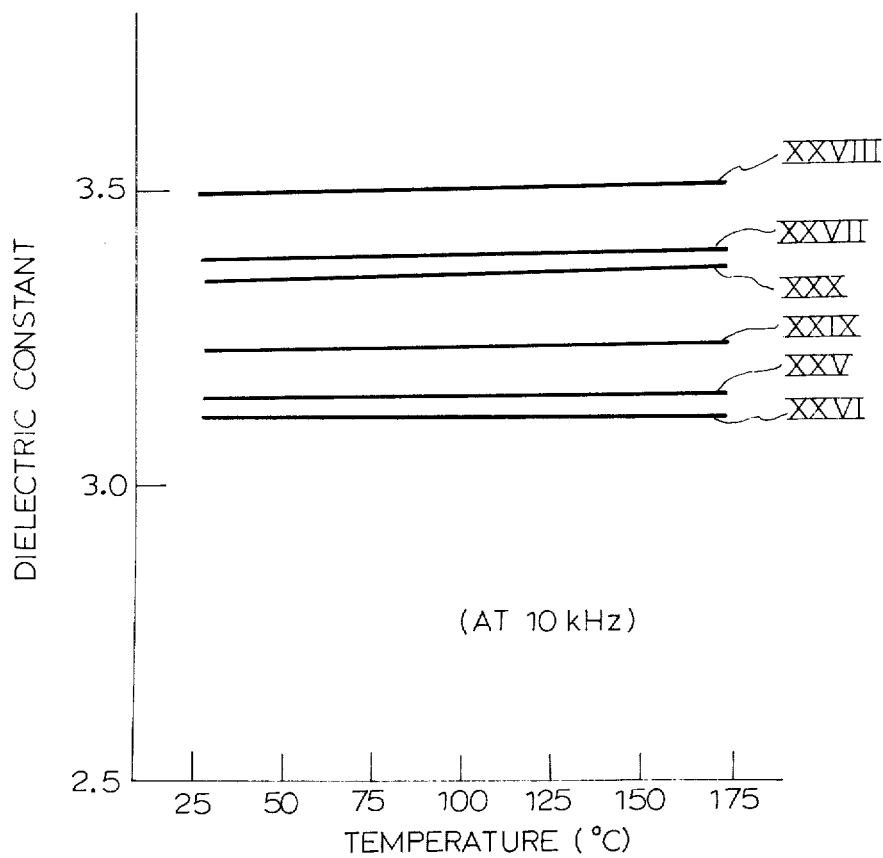

Thus FIG. 3 is a plot of the dielectric constant vs. temperature in the range of from 25°C to 175°C for the cured resins of Table 11.

Table 11

| property | results and measured values compound number | | | | | |
|---|---|---|---|---|---|---|
| | XXV | XXVI | XXVII | XXVIII | XXIX | XXX |
| viscosity | 72 | 55 | 65 | 50 | 81 | 68 |
| crack resistance | no crack | no crack | no crack | no crack | no crack | no crack |
| inflammability | nonburning | nonburning | nonburning | nonburning | nonburning | nonburning |
| arc resistance (seconds) | 181 | 25 | 185 | 120 | 182 | 31 |
| tracking resistance | KA3C | KA2 | KA3C | KA3a | KA3C | KA2 |
| dielectric constant(10kHz) | 3.15 | 3.12 | 3.39 | 3.50 | 3.23 | 3.35 |
| dielectric loss tangent | 0.006 | 0.005 | 0.009 | 0.013 | 0.007 | 0.008 |

From Table 11, it can be seen that the resins having talc powder, as shown in compounds XXV, XXVII and XXIX, have good properties in arc resistance and tracking resistance. However, the resins without talc powder, as shown in compound number XXVI, XXVIII and XXX, give poor results in arc resistance and tracking resistance.

As many apparently widely different embodiments of this invention may be made without departing from the spirit and scope thereof, it is to be understood that the invention is not limited to the specific embodiments thereof except as defined in the appended claims.

What is claimed is:

1. An electrical insulation material which comprises:
   a. a major amount of 1,2-polybutadiene,
   b. from 10 to 150 parts by weight of styrene or styrene derivative selected from the group consisting of chlorostyrene, divinylbenzene, vinyltoluene and ethylvinylbenzene,
   c. from 15 to 150 parts by weight of 2,4,6-tribromophenylacrylate per 100 parts by weight of the mixture of said 1,2-polybutadiene and said styrene or styrene derivative, and
   d. from 100 to 300 parts by weight of talc powder per 100 parts by weight of said 2,4,6-tribromophenylacrylate.

2. An insulation material according to claim 1, which is cured to a hard resin by heating at a temperature more than 100°C in the presence of a peroxide.

3. An insulation material according to claim 1, wherein said 1,2-polybutadiene has a mean molecular weight from 2,000 to 5,000.

* * * * *